United States Patent [19]

Visioli, Jr.

[11] 4,042,876

[45] Aug. 16, 1977

[54] EDDY CURRENT GAUGE FOR MONITORING DISPLACEMENT USING PRINTED CIRCUIT COIL

[75] Inventor: Armando J. Visioli, Jr., Dover, N.J.

[73] Assignee: The United States of America as represented by the United States Energy Research and Development Administration, Washington, D.C.

[21] Appl. No.: 681,644

[22] Filed: Apr. 29, 1976

[51] Int. Cl.² .............................................. G01R 33/12
[52] U.S. Cl. .................................... 324/34 D; 324/40
[58] Field of Search ............. 324/34 R, 34 D, 34 PS, 324/34 TK, 34 O, 40; 331/65; 328/5

[56] References Cited

U.S. PATENT DOCUMENTS

| 2,747,152 | 5/1956 | Greene | 324/34 D |
| 3,444,460 | 5/1969 | Penney, Jr. | 324/40 |

FOREIGN PATENT DOCUMENTS

| 2,158,387 | 5/1973 | Germany | 324/340 |
| 1,066,057 | 4/1967 | United Kingdom | 324/34 PS |

OTHER PUBLICATIONS

Smith et al; *Ostimization of Eddy Current Measurements of Coil to Conductor Spacing*; Nat. Exal; Dec. 1975; pp. 279-283 & 292.

*Primary Examiner*—Robert J. Corcoran
*Attorney, Agent, or Firm*—Dean E. Carlson; Stephen D. Hamel; David E. Breeden

[57] ABSTRACT

A proximity detection system for non-contact displacement and proximity measurement of static or dynamic metallic or conductive surfaces is provided wherein the measurement is obtained by monitoring the change in impedance of a flat, generally spiral-wound, printed circuit coil which is excited by a constant current, constant frequency source. The change in impedance, which is detected as a corresponding change in voltage across the coil, is related to the eddy current losses in the distant conductive material target. The arrangement provides for considerable linear displacement range with increased accuracies, stability, and sensitivity over the entire range.

3 Claims, 5 Drawing Figures

EDDY CURRENT GAUGE FOR MONITORING DISPLACEMENT USING PRINTED CIRCUIT COIL

BACKGROUND OF THE INVENTION

This invention was made during the course of, or under, a contract with the Energy Research and Development Administration.

This invention relates generally to non-contact type proximity detection devices and more specifically to an improved eddy current type proximity detection system in which a printed circuit coil is employed as the sensing medium in the system.

In the art of non-contact eddy current type proximity detection devices, it has generally been the practice of winding probe coils in the form of a doughnut or cylindrical coil with a rectangular cross section. These early coils were primarily utilized for non-conducting displacement or distance measurements of metallic targets at relatively small coil-to-target separations. However, for improved sensitivity and dynamic range in absolute separation measurments, significantly larger coils are required. The fabrication of these larger coils utilizing standard wire techniques presents mechanical, orientation and assembly problems which precluded repeatable probe systems where tight reproducibility requirements are extant. The need for enhanced performance relative to sensitivity, stability and most particularly extended range, mandates the use of larger diameter coils with flatter profiles. The "pancake" or flat, spiral-wound coil reduces internal losses and maximizes the characteristics deemed necessary for improved performance. Orienting wire into a spiral pancake configuration of fixed geometrical relationship is difficult to implement; however, "spiral-wound" flat or pancake coils are easily, economically and repeatably fabricated using printed circuit (PC) techniques. In addition, the PC technique allows orientation of the conductor maximum width in a plane which maximizes the inductive field flux density.

The electronic circuitry utilized with the proximity device herein described has been designed for maximum stability under a wide range of environmental conditions, as well as optimum sensitivity to changes in electrical performance of the probe coil as influenced primarily by changes in inductive "eddy current" levels.

SUMMARY OF THE INVENTION

This invention was evolved with the object of providing an improved eddy current type displacement measuring system to obtain improved accuracy, stability, sensitivity, and range.

Further, it is an object of this invention to provide an eddy current type displacement measuring system as set forth in the above object which is easily and economically manufactured with consistent reproducibility.

Yet another object of this invention is to provide an eddy current type displacement measuring system with an improved proximity probe in which the sensing coil may be reproduceably manufactured by standard printed circuit techniques.

Other objects and many of the attendant advantages of the present invention will be obvious from the following detailed description taken in conjunction with the accompanying drawings.

DETAILED DESCRIPTION

Figure 1:
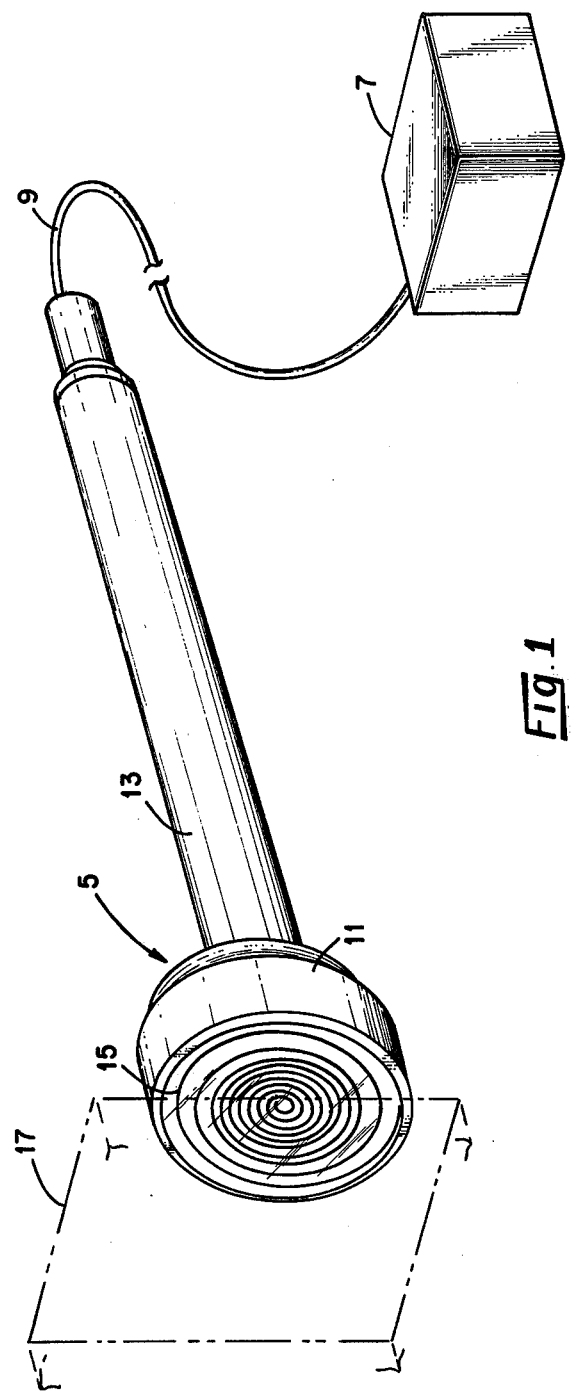
FIG. 1 is a pictorial view of a proximity detection system according to the present invention in which the proximity probe is connected by means of a coaxial cable to a signal processing circuit.

With initial reference to FIG. 1, a probe arrangement according to the present invention is shown in which the probe 5 is connected to the signal processing circuit 7 by means of a coaxial cable 9. The probe 5 includes a probe head 11 which is adapted to hold the probe coil 15 which is illustrated here as a single plane, spiral-wound coil disposed in the face of the probe head 11. The probe head 11 is connected to a tubular member 13 which may be used to support the probe in various conventional manners for gauging displacement, for example, from a metal object 17 shown in phantom. Although various printed circuit coil arrangements may be used, the preferred coil arrangement is of the spiral, pancake configuration 15 fabricated by printed circuit techniques. The printed circuit fabrication provides a repeatable and economic approach to coil manufacturing.

Figure 2:
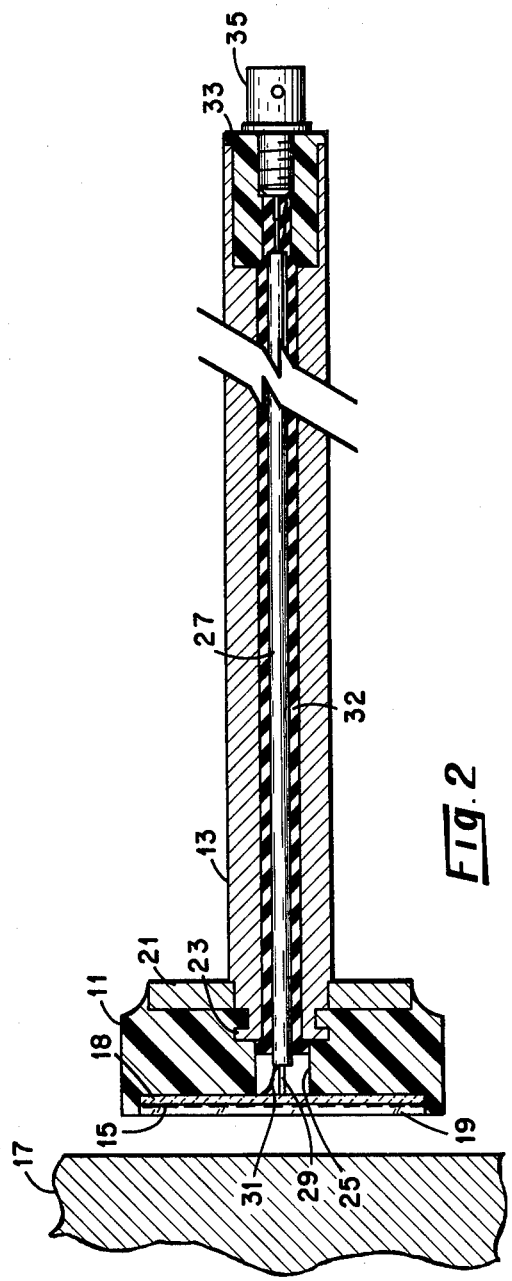
FIG. 2 is a cross sectional view of the proximity probe shown in FIG. 1.

Referring now to FIG. 2, wherein like reference numerals refer to identical parts of the probe 5 shown in FIG. 1, the probe head 11 is formed of a cylindrical shaped plastic housing having a recessed front portion adapted to receive the printed circuit board 18 which carries the metallic copper pattern coil 15. The board 18 is cemented in the recess in head 11. The board 18 and forward facing coil conductors 15 are sealed with a thin coating of Low Dielectric Loss material, $K' \leq 3$, having a Low Dissipation Factor, $D \leq 0.0007$, typically a polystyrene material. A further protective seal is provided over the face thereof with an epoxy material 19. The back of head 11 is adapted to receive a metal back plane shield 21 which may be bonded to the back of head 11 or pressed within a recess within the head 11, as shown in FIG. 2. The shield 21 is in the form of an annular ring having a central opening adapted to receive the rigid tubular member 13. The tube 13 is provided with a flange portion 23 at the probe head end thereof which secures the head member housing 11 to the end of tube 13 so that the head 11 is securely oriented with its face perpendicular to the axes of the tubular member 13. This rigid configuration may be formed by first placing the back plane shield 21 onto the tube 13 and subsequently casting the plastic head 11 about the tube end flange 23.

The head 11 has a central opening 25 which is aligned with the central passageway of tube 13 wherein the coaxial cable 27 is disposed for connection to the printed circuit board 18. The central conductor 29 of cable 27 is connected to the central portion of the coil 15 through the printed board 18. The shield conductor 31 of cable 27 is connected to the other end of the coil 15 at the outer periphery of the board 18. The particular configuration of the coil 15 will be described in detail hereinbelow. The cable 27 is held centrally within the tube 13 opening by means of a rubber spacer 32 which may be formed by filling the void between the conductor 27 and the tube 13 inner wall with a silicon rubber compound which subsequently sets, forming the spacer 32. The opposite end of tube 13 is provided with a threaded inner diameter sleeve 33 which is formed of an electrically insulating material, such as nylon. The sleeve 33 is adapted to threadably receive a coaxial cable connector 35 which is connected to the cable 27. When the probe 5, as shown in FIG. 2, is in use it is disposed adjacent to an electrically conductive surface 17 and the cable 9, as shown in FIG. 1, is connected to the connector 35.

Figure 3:
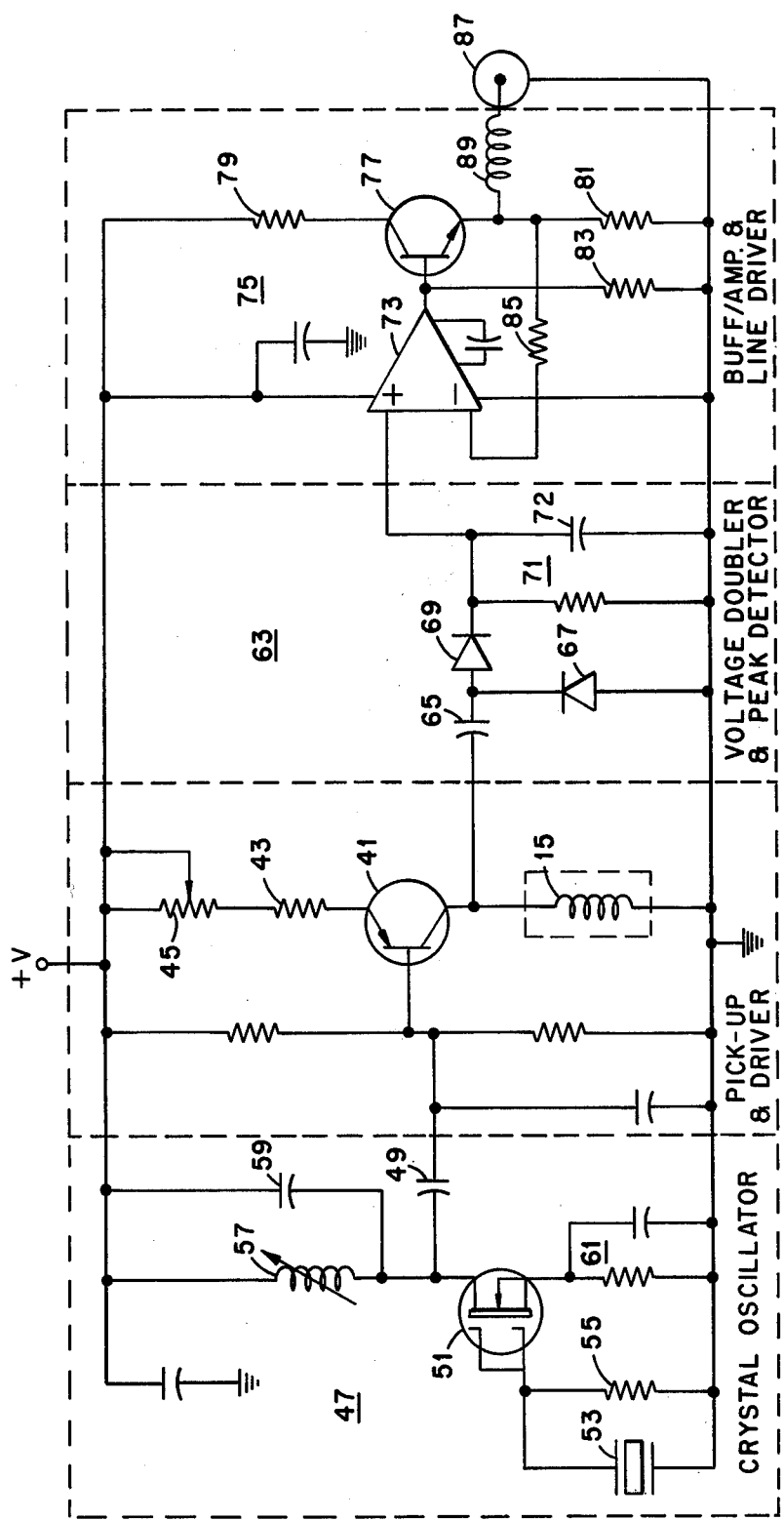
FIG. 3 is a schematic diagram of the signal processing circuit shown in FIG. 1, including a schematic representation of the pickup coil of the proximity probe shown in FIG. 1.

Referring now to FIG. 3, wherein there is shown a complete circuit schematic for the system, as shown in FIG. 1, the pickup coil 15 is shown as an inductor in the circuit schematic. Typically, the coil has an inductance of approximately 30 microhenries.

The pickup coil 15 is connected in a driver circuit in which one lead (cable 9, shield) of the pickup coil is connected to ground and the opposite lead (cable 9, inner conductor) is connected to the collector of a PNP transistor 41. The emitter of transistor 41 is connected to the positive voltage supply by means of a series connected resistor 43 and a potentiometer 45. The potentiometer 45 is used to establish the pickup coil alternating current level. The pickup coil 15 is driven by means of a constant frequency AC current drive signal developed from a crystal control oscillator 47. The oscillator 47 is coupled to the base of transistor 41 by means of a coupling capacitor 49. Transistor 41 is biased to provide a linear output over the pickup coil 15 operating voltage range.

The oscillator 47 includes an insulated gate field effect transistor (F.E.T.) 51 which is connected at its gate electrode to a crystal 53 which is chosen to provide the particular circuit oscillation. Crystal 53 is connected to ground at the other end and has a resistor 55 connected in parallel therewith. The drain electrode of F.E.T. 51 is connected to the positive supply voltage through a variable inductor 57 which has a capacitor 59 connected in parallel therewith to form a tuning circuit. This circuit provides a crystal control tuned-drained, tune-gate oscillator. The source of the F.E.T. is connected to ground through a parallel RC network 61.

The AC voltage developed across the pickup coil 15 is peak detected and filtered by a cascade voltage doubler and peak detector circuit 63. The collector of transistor 41 is connected through a coupling capacitor 65 to the cathode of a diode 67 and to the anode of a diode 69. The anode of diode 67 is connected to ground while the cathode of diode 69 is connected to ground through an RC filter circuit 71. The filter output is connected to the noninverting input of an operational amplifier 73 of a combination buffer amplifier and line driver circuit 75. The amplifier 73 is a linear wideband F.E.T. operational amplifier whose function is to buffer the detected signal (which is proportional to displacement) developed across capacitor 72 of the filter network 71. The output of amplifier 73 is connected to the base of a line driving transistor 77. Transistor 77 is an NPN transistor which has its collector connected to the positive supply through biasing resistors 79 and the emitter connected to ground through a biasing resistor 81. The output of amplifier 73 is also connected to ground through a load resistor 83. The amplifier 73 is connected in a negative feedback arrangement by means of a resistor 85 connected between the emitter of transistor 77 and the inverting input of operational amplifier 73.

The effective output impedance of the system is lowered by transistor 77, thereby adding driving capabilities to the amplifier network. The output line capacitance is charged by the low ohmic resistance of transistor 77, while line discharge is effected through resistor 81. The inner action of resistor 81 and the output line capacitance limits the frequency and slew rate of the output signal. Therefore, the valve selected for resistor 81 should be a compromise which allows adequate speed of response yet minimizes the power dissipation in transistor 77.

The output line 87 of the circuit is a coaxial cable having its shield conductor connected to ground and the center conductor connected to the emitter of transistor 77 through an inductor 89. The inductor 89 and the output line 87 capacitance provide lowpass, high-frequency filtering of the output signal. The line 87 carries a DC signal proportional to the change in impedance of the coil 15, which in turn is proportional to its distance from a conducting surface.

Figure 4:
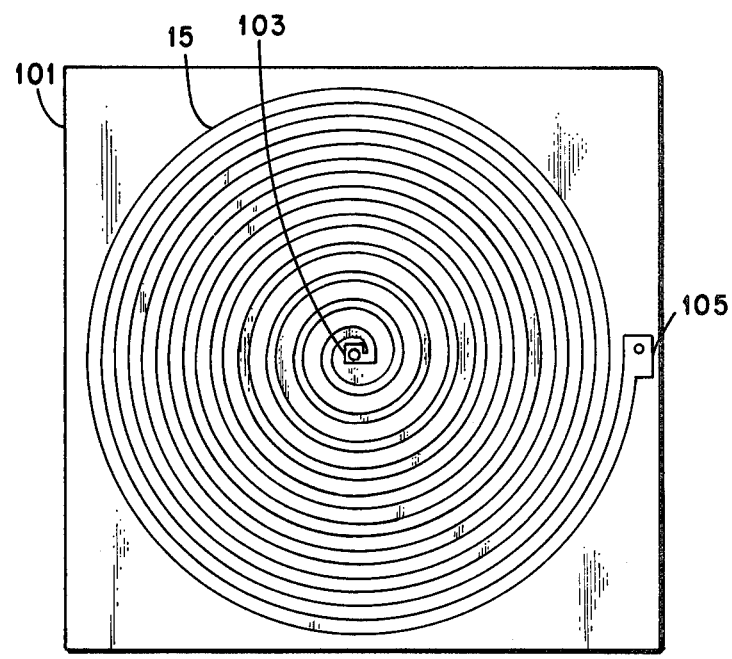
FIGS. 4 and 5 are alternate embodiments of printed circuit probe coil arrangements which may be used in the proximity probe shown in FIGS. 1 and 2.
Figure 5:
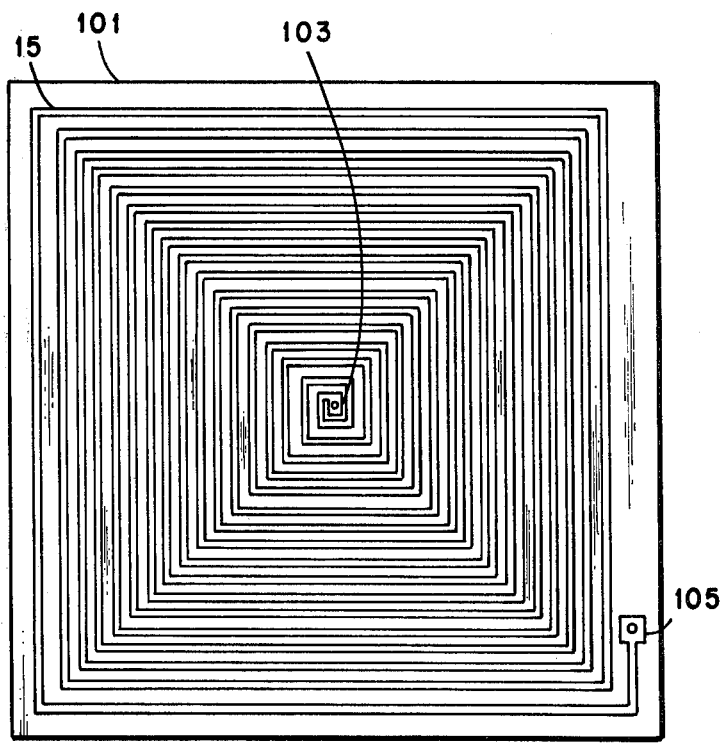

Experimentation with coil designs indicated that the diameter of the coil (primarily outside diameter) is the controlling factor in sensitivity to displacement. The larger the coil, the greater the sensitivity and the greater the usable range of detection. Thus, various single plane wound designs were evaluated, such as the printed circuit forms shown in FIGS. 4 and 5. The single plane, spiral-wound coil, as shown in FIG. 4, is preferred because it generates an inductive field of more uniform and geometrically regular pattern. This regular inductive pattern resulted in a higher system "Q", with less stray capacitance, for any given inductance. The higher the "Q" the greater the sensitivity. In addition, the circular orientation was more adaptable to the mechanical configuration of the probe.

Coils of this type may be easily manufactured by standard photographic printed circuit techniques. For example, the printed circuit board 101 may be of conventional type which is formed of rigid insulating material having a conductive surface coating, such as copper, thereon. The copper is removed from the board by standard photo etching techniques to leave the copper coil 15 according to the desired pattern. The conductor path on the printed circuit board is approximately 0.005 inch wide by 0.0027 inch thick, and the size and number of turns in the spiral depend upon the range and sensitivity desired. The use of printed circuit techniques for fabrication of the coil results in a lower cost, physically smaller, more uniform and repeatable probe sensing coil.

The printed circuit board 101 is trimmed to fit the particular probe head, as shown in FIGS. 1 and 2, and connected to the probe cable 27 prior to sealing the printed circuit with the encapsulating coating 19, as shown in FIG. 2.

In operation, the probe 5 may be mounted in a conventional manner by hardware adapted to the tubular section 13 to position the probe head 11 adjacent a static or dynamic member formed of a conductive material to sense the displacement between the probe head 11 and the metal body. The output of the signal processing circuit 7, as shown in FIG. 3, as line 87 may be connected to a calibrated voltmeter or other conventional recording means to record the DC output voltage proportional to the displacement. The fixed frequency signal from oscillator 47 is applied to the coil 15 through transistor 41. The current through the coil is adjusted by means of potentiometer 45 to provide the required sensitivity as outlined above.

The changing magnetic flux created by driving the coil 15 with an alternating signal generates an electric field inducing current loops or eddy currents within the conducting surface of the target 17. The induced eddy current density in the conducting surface is in a direction which causes it to oppose the enclosed magnetic flux. The net reduction in the magnetic flux density, which is proportional to the separation between the coil 15 and the conduction surface 17, tends to reduce the effective inductance of the pickup coil. This in turn is reflected in a corresponding change in voltage across the coil 15 which changes in direct relationship with the change in inductance.

The voltage across the coil is sensed by a voltage doubler peak detector 63 which provides a DC output signal proportional to the peak values of the AC drive signal developed across coil 15. The negative portion of the AC coil signal is directed to ground through diode 67 while the positive portion is applied to the filter 71 through diode 69. Thus, the detected signal is connected to a positive DC signal. The time constant of the filter circuit is selected so that at the selected AC drive signal frequency the DC voltage across capacitor 72 rides the positive peak of the detected AC signal. The voltage doubler circuit serves to detect the peak-to-peak voltage output, thereby providing twice the peak amplitude.

In the case of measuring the runout, for example, of a rotating metal member, the DC output of circuit 63 will vary according to the variation in the peak-to-peak AC signal across the coil 15 which in turn varies with the measured runout. This peak-to-peak detected signal is buffered in the output circuit 75 to prevent loading the detector and is applied to the recording device connected to the line 87 through a line driver 77. The DC voltage recorded from line 87 will reflect an instantaneous change in displacement and continuously provide an output proportional to the eccentricity or displacement observed by and relative to the probe. The single plane, spiral-wound probe configuration, as shown in FIG. 4, has been found to be the preferable probe coil design for a more linear output over displacements in the range of from 0 to about 1 inch. The sensitivity for a set point of 10 volts out, that is adjusting potentiometer 45 to obtain 10 volts output as .5 inch displacement, provides a sensitivity of 10 millivolts per mil.

What is claimed is:

1. An improved eddy current type proximity gauge for measuring the displacement of an electrically conductive member from a probe head of said gauge, and generating an output signal whose amplitude is proportional to said displacement, comprising:

a probe coil spiral wound in a single plane, said coil being disposed in said probe head for parallel displacement of the coil winding plane relative to said conductive member, said probe head being formed of a molded non-electrically conductive housing having a front portion adapted to receive said coil;

an electrically conductive back plane shield molded in the back surface of said housing parallel and adjacent to the plane of said coil but electrically insulated from said coil;

a probe head mounting tube connected to the back of said probe housing, said tube and said back plane shield having a central coaxial passageway communicating with a central passageway in said probe head housing for receiving a coaxial extension cable having a central conductor of one end connected to the central end of said spiral wound coil and a shield conductor of said one end of said cable connected to the outer end of said spiral wound coil;

a fixed frequency oscillator for generating an AC drive signal, said oscillator including an insulated gate field effect transistor (F.E.T.) having a gate, source, and drain electrodes, a frequency control cystal connected between said gate electrode of said F.E.T. and ground potential, an inductor connected between the drain electrode of said F.E.T. and a positive voltage source, a capacitor connected in parallel with said inductor, a resistor connected between said source electrode of said F.E.T. and ground and a capacitor connected in parallel with said resistor, said drain electrode of said F.E.T. forming the output of said oscillator producing said AC drive signal;

a transistor having a base emitter and collector electrodes, said collector electrode of said transistor connected to the central conductor of the extended end of said coaxial cable, said shield conductor of said extended end of said cable connected to ground;

a coupling capacitor connected between said drain electrode of said F.E.T. and said base electrode of said transistor;

biasing circuit means connected to the base electrode of said transistor for producing a linear voltage output over the coil voltage operating range;

a potentiometer connected between said emitter electrode of said transistor and said positive supply voltage source for setting the AC drive signal current supplied to said probe coil for the desired gauge sensitivity;

a cascaded voltage doubler and peak detector circuit means connected to the collector of said transistor for generating a DC signal at an output thereof which follows the peak-to-peak AC signal voltage developed across said probe coil which is proportional to the displacement of said probe head coil relative to said electrically conductive member; and an output circuit means including a linear wideband buffer amplifier having an input connected to the output of said voltage doubler and peak detector circuit means for buffering the detected DC signal from the system output.

2. The proximity gauge as set forth in claim 1 wherein said probe coil is a printed circuit conductor.

3. The proximity gauge as set forth in claim 2 wherein the DC output signal is a linear function of the measured displacement over a range of from 0 to about 1 inch.

* * * * *